Patented Apr. 20, 1954

2,676,187

UNITED STATES PATENT OFFICE 2,676,187

PREPARATION OF AROMATIC POLYBASIC ACID CHLORIDES

Robert Everett Foster, New Castle, and Paul Lawrence Salzberg, Wilmington, Del., assignors to E. I. du Pont de Nemours & Company, Wilmington, Del., a corporation of Delaware No Drawing. Application March 4, 1953, Serial No. 340,374

12 Claims. (Cl. 260—544)

This invention relates to the preparation of aromatic polybasic acid chlorides and, more particularly, to the preparation of phthaloyl chlorides.

Aromatic polybasic acid chlorides, such as for example terephthaloyl chloride, are of great technical importance in the preparation of condensation polymers containing aromatic groups, such as polyamides or polyesters. The preparation of aromatic polybasic acid chlorides has heretofore involved the use of expensive chemicals in that it has been necessary to start with the polybasic acids themselves, which in many cases are by no means easy to prepare, and to react them with chlorinating agents such as phosphorus pentachloride or thionyl chloride.

An object of the present invention is to provide a process of preparing aromatic polybasic acid chlorides in one step which process does not necessitate the use of a corresponding polybasic acid and in which the chlorinating agent is chlorine itself. A further object is to provide such a process adapted to be carried out in one step and to give high yields. A more particular object is to provide such a process for the preparation of phthaloyl chlorides and, specifically, terephthaloyl chloride. Other objects will be apparent from the description of the invention given hereinafter.

The above objects are accomplished according to the present invention by reacting under substantially anhydrous conditions and above a temperature of about 150° C. chlorine with an aromatic carbocyclic compound having an equal number of methyl and carboxyl substituents directly attached to nuclear carbon atoms, whereby each of the methyl and carboxyl substituents is converted to a carboxylic acid chloride substituent with simultaneous formation of hydrogen chloride.

In a more specific, preferred embodiment, the invention comprises the preparation of a phthaloyl chloride by reacting under substantially anhydrous conditions and at a temperature of 200° C. to 275° C. chlorine with a toluic acid, e. g., p-toluic acid, the reaction preferably being carried out in an inert liquid organic solvent, e. g., an inert liquid halogenated hydrocarbon solvent, and in the presence of an excess, e. g., 10% to 100%, of chlorine above the stoichiometric proportion, i. e., 10% to 100% chlorine in excess of 3 mols of chlorine per mol of the toluic acid.

The mechanism of the reaction involved is not known with certainty. The over-all reaction can be represented by the following equation, whereby in R is an aromatic nucleus directly attached through nuclear carbon atoms to the methyl and carboxyl groups, $x$ being an integer:

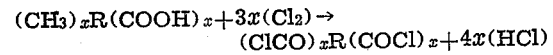

This over-all reaction can be represented by the following equation where a toluic acid is used, R being a benzene nucleus:

$$CH_3—R—COOH+3Cl_2 \rightarrow ClCO—R—COCl+4HCl$$

The following example illustrates a specific embodiment of the invention.

Example

A mixture of 31 g. of p-toluic acid, 300 g. of carbon tetrachloride as inert solvent and heat transfer medium, and 75 g. of chlorine was heated at 235° C. for 4 hours, and then at 250° C. for 4 hours in a corrosion-resistant pressure vessel. The reaction product was a clear solution which was filtered and distilled. There was obtained 49.6 g. of a solid and liquid mixture boiling in the range of 127° C. to 150° C. at 8 mm. mercury pressure. The solid product, which made up the bulk of the distillate, was shown to be terephthaloyl chloride by the following tests: Its melting point was 65–80° C. and its mixed melting point with an authentic sample of terephthaloyl chloride was 70–81° C. Its neutralization equivalent in water was 52, as compared with 51, the calculated value on the basis of the equation

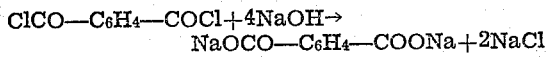

Its neutralization equivalent in methanol was 95, as compared with 101, the calculated value on the basis of the equation:

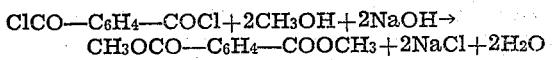

Finally, treatment with methanol and aqueous alkali converted the solid reaction product to dimethyl terephthalate, identified by its melting point of 141° C.–142° C., alone or when mixed with an authentic sample of dimethyl terephthalate.

The yield of terephthaloyl chloride was about 80%, as shown by saponifying a portion of the mixed solid-liquid reaction product. From 2 g. of the acid thus obtained, 1.65 g. of insoluble terephthalic acid was obtained after extraction of the acid mixture with boiling carbon tetrachloride.

It will be understood the above example is merely illustrative and that the invention broadly comprises the preparation of aromatic polycarboxylic acid chlorides by reacting under substantially anhydrous conditions and above a temperature of about 150° C. chlorine with aromatic carbocyclic compounds having an equal number of methyl and carboxyl substituents directly attached to nuclear carbon atoms.

The process of this invention is broadly applicable to the preparation of aromatic polycarboxylic acid chlorides from aromatic carbocyclic compounds in which the ring bears, as substituents, carboxyl and methyl groups in equal number. More than one carboxyl substituent and, correspondingly, more than one methyl substituent, can be present. The methyl and carboxyl substituents can be on the same ring or different rings. The ring can also bear inert substituents, i. e., substituents which are not substantially reactive with chlorine or with acid chlorides, such as halogen groups.

Thus, the process is applicable to the preparation of phthaloyl chloride from o-toluic acid, of isophthaloyl chloride from m-toluic acid, of 1,4-naphthalene dicarboxylic acid chloride from 4-methyl-1-naphthoic acid, of 1,5-naphthalene dicarboxylic acid chloride from 5-methyl-1-naphthoic acid, of 1,8-anthracene dicarboxylic acid chloride from 8-methyl-1-anthracene carboxylic acid, of 4,4'-biphenyl dicarboxylic acid chloride from 4-(4-tolyl)benzoic acid, of 1,2,4,5-benzene tetracarboxylic acid chloride from 4,5-dimethylphthalic acid, of 2-chloro-1,4-benzene dicarboxylic acid chloride from 2-chloro-4-methyl benzoic acid, and the like. The more accessible, and therefore preferred, starting materials are the aromatic monomethyl monocarboxylic acids in which the aromatic radical consists of one or two six-membered carbocyclic nuclei bearing no other substituents. Mixtures of two or more methyl substituted aromatic carboxylic acids can be used.

In the process of this invention, the reaction temperature should be above about 150° C. since, below that temperature, the reaction, if it takes place at all, progresses so slowly that it is impractical. The maximum reaction temperature is not critical, being limited only by the decomposition point of the reactants and reaction products. In general, it is unnecessary to operate at temperatures above 375° C., and the preferred temperature range is that from 200° C. to 275° C.

The use of pressure is not necessary, and the reaction can be carried out at atmospheric pressure if the reaction medium has a sufficiently high boiling point. However, it is in general convenient to operate in a closed vessel, which avoids possible loss of chlorine, under the pressure generated by the reactants and reaction products at the reaction pressure, or under additional inert gas pressure if desired.

The presence of light is not necessary, although in some cases illumination with actinic or ultraviolet light may be beneficial, especially at the lower reaction temperatures. Similarly, catalysts are not necessary, but again can be employed with some profit at the lower reaction temperature range. Suitable catalysts are those which generate free radicals, such as the organic peroxides or the azonitriles. It is, of course, recommended to avoid the use of catalysts which favor ring halogenation rather than side chain halogenation, such as the metal halides.

The reaction system should be anhydrous, or substantially so, since the presence of water causes side reactions. Solvents are desirably, but not necessarily, employed. The reaction proceeds satisfactorily without solvents, particularly when efficient agitation is used, but contact between the reactants is, of course, facilitated by the use of solvents. For this purpose there may be used any inert liquid solvent, that is, a solvent unreactive with the reactants and the reaction products. The halogenated hydrocarbons such as chloroform, tetrachloroethylene, tetrachloroethane, carbon tetrachloride, and the chlorobenzenes are suited for the purpose. The reaction product itself, that is, the aromatic dicarboxylic acid chloride, e. g., terephthaloyl chloride, is a good reaction medium.

The amount of chlorine used in relation to the methyl substituted aromatic acid is not critical, but obviously, if good yields are desired, it is desirable to use at least stoichiometric amounts of chlorine in accordance with the equations given above. A slight to moderate excess of chlorine can be used, e. g., from 10% to 100% excess over the stoichiometric amount, i. e., 10% to 100% chlorine in excess of 3 mols of chlorine per mol of toluic acid in the preparation of phthaloyl chlorides, but it is preferable not to use large excesses of it, in order to minimize the possibility of ring chlorination. The chlorine can be introduced all at once at the beginning of the reaction, or it can be added gradually to the mixture as the reaction proceeds.

When the reaction is carried out in a closed vessel, its progress can be followed by the rise in pressure caused by the formation of hydrogen chloride. When there is no further increase in pressure, the reaction can be considered as completed. At atmospheric pressure, the end of the reaction coincides with the end of the evolution of hydrogen chloride.

The reaction product is preferably isolated by distillation or crystallization according to known procedures. The crude product is often sufficiently pure to be utilized without purification.

An advantage of this invention is that it permits the preparation of aromatic polycarboxylic acid chlorides from reactants which are much more economical than those heretofore employed. In particular, the aromatic monomethyl monocarboxylic acids are much more readily accessible than the corresponding dicarboxylic acids. Moreover, the yields in this new reaction are in general excellent and often approach the theoretical. Further, the process is essentially a one-step process which can be readily and economically carried out.

As many apparently widely different embodiments of this invention may be made without departing from the spirit and scope thereof, it is to be understood that the invention is not limited to the specific embodiments thereof except as defined in the appended claims.

The invention claimed is:

1. Process of preparing an aromatic polycarboxylic acid chloride which comprises reacting under substantially anhydrous conditions and above a temperature of 150° C. chlorine with an aromatic carbocyclic compound having an equal number of methyl and carboxyl substitutents directly attached to nuclear carbon atoms.

2. Process of preparing an aromatic polycarboxylic acid chloride which comprises reacting under substantially anhydrous conditions and at a temperature of 200° C. to 275° C. chlorine with an aromatic carbocyclic compound having an equal number of methyl and carboxyl substituents directly attached to nuclear carbon atoms, said reaction being carried out in an inert liquid organic solvent.

3. Process as set forth in claim 2 wherein said reaction is carried out in an inert liquid halogenated hydrocarbon solvent.

4. Process of preparing a phthaloyl chloride which comprises reacting under substantially anhydrous conditions and above a temperature of 150° C. chlorine with a toluic acid.

5. Process of preparing a phthaloyl chloride which comprises reacting under substantially anhydrous conditions and at a temperature of 200° C. to 275° C. chlorine with a toluic acid, said reaction being carried out in an inert liquid organic solvent.

6. Process of preparing a phthaloyl chloride which comprises reacting under substantially anhydrous conditions and at a temperature of 200° C. to 275° C. chlorine with a toluic acid, said reaction being carried out in an inert liquid organic solvent and in the presence of 10% to 100% chlorine in excess of 3 mols of chlorine per mol of said toluic acid.

7. Process as set forth in claim 6 wherein said reaction is carried out in an inert liquid halogenated hydrocarbon solvent.

8. Process of preparing terephthaloyl chloride which comprises reacting under substantially anhydrous conditions and above a temperature of 150° C. chlorine with p-toluic acid.

9. Process of preparing terephthaloyl chloride which comprises reacting under substantially anhydrous conditions and at a temperature of 200° C. to 275° C. chlorine with p-toluic acid, said reaction being carried out in an inert liquid organic solvent.

10. Process of preparing terephthaloyl chloride which comprises reacting under substantially anhydrous conditions and at a temperature of 200° C. to 275° C. chlorine with p-toluic acid, said reaction being carried out in an inert liquid organic solvent and in the presence of 10% to 100% of chlorine in excess of 3 mols of chlorine per mol of p-toluic acid.

11. Process as set forth in claim 10 wherein said reaction is carried out in an inert liquid halogenated hydrocarbon solvent.

12. Process as set forth in claim 10 wherein said reaction is carried out in carbon tetrachloride as a solvent.

No references cited.